July 6, 1937.    W. H. ATKINSON    2,085,887
ILLUMINATED DIAL INDICATING DEVICE
Filed May 17, 1935    2 Sheets-Sheet 2
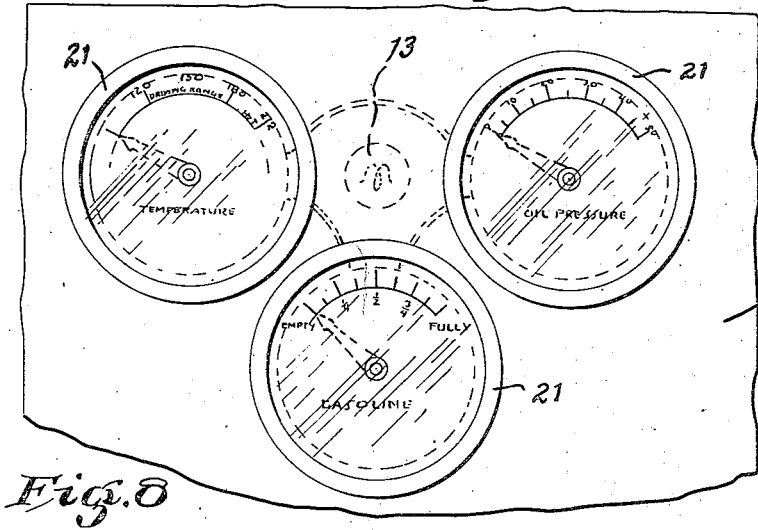
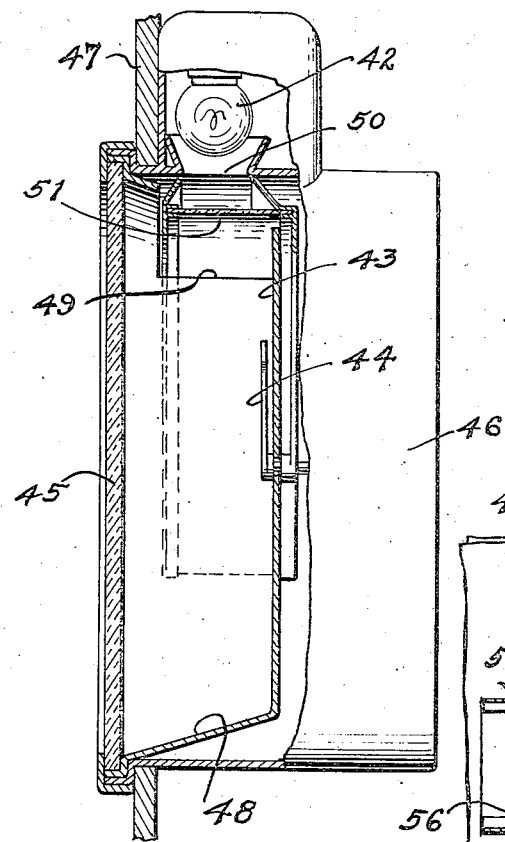
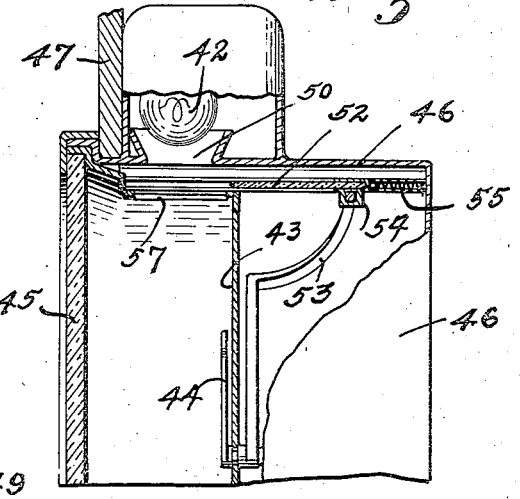
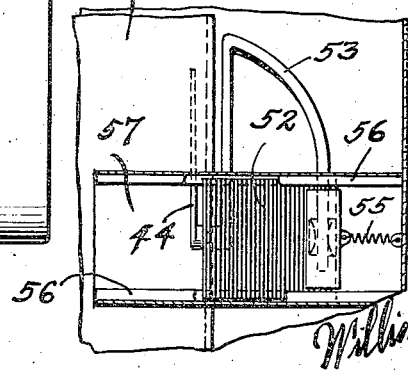
Inventor
William H. Atkinson Patented July 6, 1937

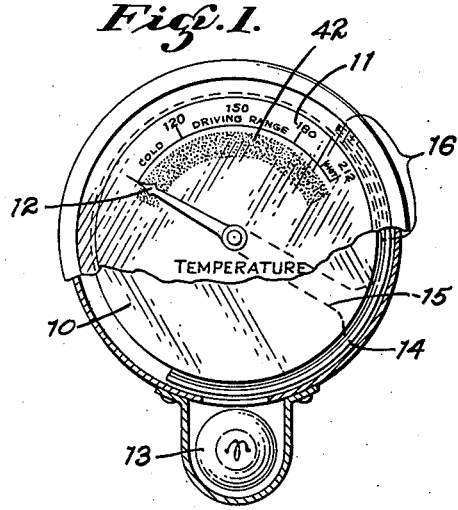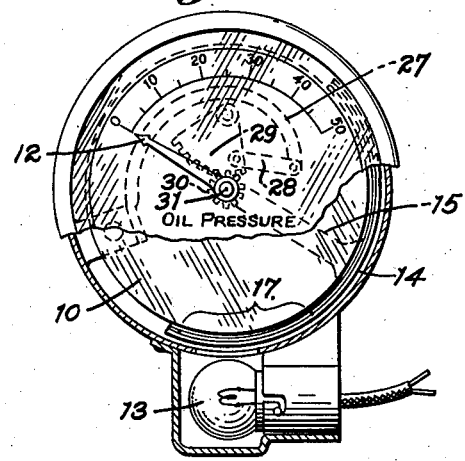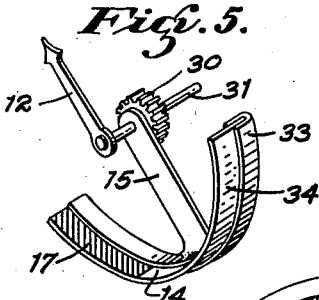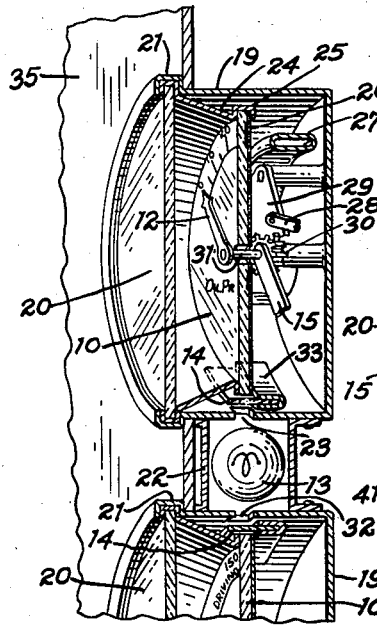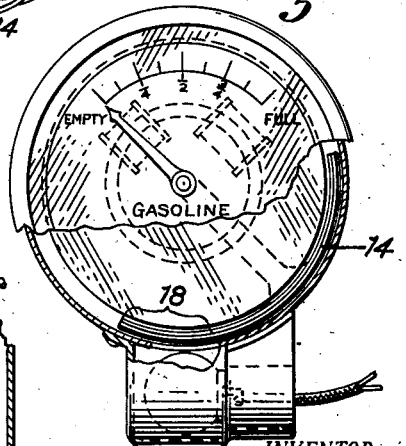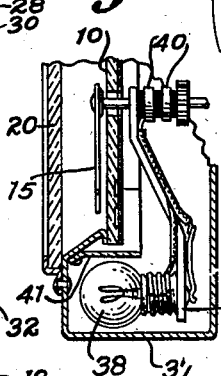

2,085,887

UNITED STATES PATENT OFFICE 2,085,887

ILLUMINATED DIAL INDICATING DEVICE

William H. Atkinson, San Francisco, Calif., assignor to The Magnavox Company, Fort Wayne, Ind., a corporation of Arizona Application May 17, 1935, Serial No. 22,066

12 Claims. (Cl. 240—2.1)

The present invention relates to indicating instruments and like devices and more particularly to instruments or devices having a transparent dial with indicating indicia thereupon which is adapted to be rendered illuminous by a light disposed at the edge of the transparent dial.

An object of the invention is to provide an indicating device having a new and novel illuminating arrangement.

Another object of the invention is to provide an illuminated dial indicating device having a new and novel arrangement for illuminating same, wherein the color of the illumination of said dial will change when the indicating device indicates a predetermined condition.

Another object of the invention is to provide in an illuminated indicating device, means which will illuminate the dial and pointer thereof and change the color of the illumination when the pointer reaches a predetermined point between the limits of its travel.

Another object of the invention is to provide in connection with an edge illuminated dial, means which will outline in a new and novel manner a pointer associated with said dial.

Another object of the invention is to provide in connection with an indicating instrument having a transparent edge illuminated dial, means cooperating with a pointer associated with said dial which will change the color of the illumination of said dial as said pointer moves thereover.

Another object of the invention is to provide a new and novel arrangement, wherein a plurality of indicating instruments or devices may be illuminated from a single source of light in a new and novel manner.

Another object of the invention is to provide an arrangement, wherein a plurality of indicating dials may be illuminated from a single source of light and in which the color of the illumination of any one of said dials may be changed to indicate a predetermined condition independently of the other of the said dials.

In connection with instruments and devices of the character contemplated by this invention, it is often desirable to provide some means to indicate a desired and/or a dangerous condition as indicated by the instrument or device. It is therefore a further object of the present invention to provide means which will change the color of the light refracted by the indicia upon the dial of the device when the pointer associated therewith reaches a predetermined point between the limits of its travel.

In the art to which the invention relates it is also often desirable to illuminate the dial of an indicating instrument with a soft and/or subdued light which will not produce a glare. This is particularly true upon the instrument board of an automobile. Such a form of illumination can be produced by forming the dial of the instrument upon a plate of glass by etching the indicator graduations thereupon and edge illuminating said plate of glass from a source of light arranged at the edge thereof. With such an arrangement the light from said source will be conducted edgewise through the glass and refracted at the points where the graduations are etched thereupon without producing a glare. This is because the light transmitted through the plate of glass will only be refracted into the eye of the observer at the points where the graduation etching occurs upon the plate of glass. With such an arrangement it will be understood that when a pointer is disposed over the dial there will be very little if any illumination upon the pointer. Therefore it is a further object of the invention to provide, in connection with an edge illuminated dial, means which will render the pointer more visible.

In carrying out the invention, the indicating instruments or devices are preferably constructed with a transparent plate of glass or other material having indicator indicia cut or etched therein, so as to refract light rays transmitted edgewise through the plate glass or other material from a source of light at one side thereof. Associated with the indicator indicia produced as above upon the transparent glass or like member, there is a pointer which is responsive to the conditions to be indicated by the device. To change the color of the dial illumination there is, in a preferred arrangement, provided a color screen which is adapted to be moved between the edge of the transparent dial member and the source of light as the pointer moves adjacent the graduated indicia upon the dial. In another arrangement, the transparent light conducting member that forms the dial upon which the graduations are formed, may be surrounded by a stationary continuous or short length of light coloring screen about which a light associated with the pointer may move to thus change the color of the light impinging upon the edge of said transparent light conducting member as the pointer moves thereover.

In order to provide illumination for the pointer of an instrument constructed in accordance with this invention from the same source of light which illuminates the dial indicia, the invention also contemplates the provision of an etched or frosted area beneath the pointer which, by the diffusion of light therethrough, will serve to outline the pointer and thereby render it more visible.

For a better understanding of the invention reference should be had to the accompanying drawings wherein there is shown, by way of illustration and not of limitation, preferred embodiments thereof.

In the drawings, wherein like numerals refer to like parts through the several views;

Figure 1 is a front view of a temperature indicating instrument for an automobile, having a portion broken away to expose the inner details thereof, Figure 2 is a view similar to Figure 1, showing the invention applied to an oil pressure gauge for an automobile, Figure 3 is a view similar to Figures 1 and 2, showing the invention applied to a gasoline gauge for an automobile, Figure 4 is a partial perspective and sectionalized view of the instrument illustrated in Figure 2 of the drawings, Figure 5 is a perspective view of the instrument pointer and color screen supporting and driving shaft of an instrument constructed as illustrated in Figure 4, Figure 6 is a fragmentary vertical and sectionalized view showing a modified form of the invention, Figure 7 is a fragmentary front view in elevation showing three instruments mounted upon a panel with an illuminating source of light disposed in common relation to all of the instruments, Figure 8 is a fragmentary side view of a modified form of instrument having a portion broken away to disclose the interior construction, Figure 9 is a view similar to Figure 8 showing a further modified arrangement, and Figure 10 is a fragmentary plan view showing the arrangement illustrated in Figure 9.

For the purpose of describing the invention there is shown in the accompanying drawings a plurality of indicating instruments or devices such as are commonly used in connection with automobiles, and while the instruments chosen for illustration show a dial having only a short arcuate sector of graduations, it is to be understood that the invention is equally applicable to instruments and/or devices wherein the graduations extend completely around the dial thereof.

In Figure 1 of the drawings, there is shown a temperature indicator such as is used upon an automobile to indicate the temperature conditions of the engine, and in Figures 2 and 3, there is shown respectively, an oil pressure gauge such as is used to indicate the condition of pressure in the lubricating system of an automobile, and an electromagnetically actuated fuel indicator which in conjunction with means in the fuel tank of an automobile serves to indicate the amount of fuel available for the operation of the automobile.

In each of the above illustrations, the dial designated by the numeral 10, comprises a transparent light conducting member of glass or other material having graduations and/or indicator indicia 11 etched or otherwise formed thereupon. Associated with the dial 10 there is a pointer 12 that is adapted to move adjacent the indicator indicia 11 in response to the conditions for which the instrument or device is designed. Arranged preferably at the edge of the dial 10 there is a source of light 13 which may be an ordinary incandescent lamp or other source of illumination, and associated with the pointer 12 there is a color screen 14 which is adapted to be interposed and/or moved between the source of light 13 and the edge of the dial 10 to control the color of the light transmitted from the light source 13 to the edge of the dial 10. In the figures of the drawings under discussion, the color screen 14 is shown as supported upon an arm 15 that is attached to the shaft upon which the pointer 12 is mounted. However, it is to be understood that the color screen 14 may be supported and moved by other means which will be apparent to those skilled in the art.

In Figure 1, the color screen 14 is shown as having a portion 16 which is preferably red in color and the remaining portion of this color screen is preferably colorless and clear. In the arrangement illustrated in Figure 2 of the drawings, the color screen 14 has a short section 17 which is red in color, while the remaining portion of the screen is clear, and in Figure 3 of the drawings, the color screen 14 is shown as having a short section 18 which is preferably colored red.

With the above arrangements, it will be seen that when the temperature indicated by the instrument illustrated in Figure 1 reaches a value approximately 180° F. the color of the light transmitted from the light source 13 will be changed to red to correspond with the color section 16, and that in the instrument illustrated in Figure 2, the color of the dial illumination will change to red to correspond with the color screen section 17 to provide a color signal when the oil pressure of the lubricating system reaches a value of 20 upon the dial 10, this being the value of pressure below which it is considered unsafe to operate the engine, and that in the arrangement illustrated in Figure 3, the color of the dial illumination will change to correspond with the color section 18 of the color screen 14, and thus produce a color signal when the fuel in the tank has been approximately three-fourths used.

As shown in Figure 4 of the drawings, each of the devices or instruments previously described, has a suitable housing 19 with a protecting glass 20 over the front face thereof. The glass face 20 may be secured in any suitable manner upon the housing 19, as for instance, by a flanged rim 21. At the bottom or at any other convenient location upon the housing 19 there is provided a suitable lamp supporting housing 22 in which the source of light 13 may be disposed. Formed in the wall of the housing 19 adjacent the light source 13, there is a properly dimensioned slot 23 through which light from the source 13 may be projected upon an exposed edge of the transparent dial 10. As here illustrated, the transparent dial 10 is supported by a truncated conical member 24 which extends rearwardly from the front face of the device. In the preferred arrangement, this truncated conical supporting member 24 is provided with a continuous flange 25 that completely surrounds the edge of the transparent dial 10, except for a small portion which corresponds to the dimensions of the slot 23 formed in the housing 19. This flange 25 serves to prevent the escape of light from the edge of the glass dial and thus somewhat intensifies the illumination of the graduations 11 thereupon. To further intensify the illumination and provide a contrasting background, the dial 10 may be and is preferably provided with an opaque backing member 26 which, in addition to providing a contrasting background, also conceals the operating mechanism of the instrument or device that is usually disposed in back of the transparent dial 10. The device here illustrated is the oil pressure gauge shown in Figure 2 of drawings. This device has a pressure responsive coil 27, the free end of which is connected by a link 28 (see Figure 2 of the drawings) with a suitably mounted gear sector 29 that engages a pinion 30 upon a shaft 31 which supports the pointer 12. The color screen supporting arm 15 is here shown as connected directly to the shaft 31 so that when the shaft 31 rotates the color screen 14 will be moved in synchronism with the pointer 12 and move the colored section of the color screen adjacent the slot 23 and between this slot and the exposed edge of the transparent dial 10, so as to effect a change in the color of the dial illumination when the pointer 12 indicates a predetermined condition. This figure of the drawings also shows an arrangement wherein two instruments or devices equipped in accordance with the present invention, by being mounted adjacent each other, may be illuminated from a single source of light. As here shown, a second instrument or device is disposed immediately below the oil pressure gauge so that light from the source 13 may be projected downwardly into the edge of its transparent dial 10. In this arrangement, the top of the dial 10 of the second device is exposed to the light rays which pass through a slot 32 formed in the top of the second housing 19.

In Figure 5 of the drawings, the color screen supporting arm 15 is shown as having an arcuate color screen supporting portion 33 upon which the color screen 14 is mounted. As here shown, the color screen 14 has its lefthand end colored red, as indicated by the crosshatching 17. The remaining portion of the color screen may be colorless and/or of any contrasting color, as indicated by the portion 34. While the color screen is here shown as comprising a colored section 17 and a colorless section 34, it is to be understood that where desired, the colorless section 34 may be omitted entirely so that the light from the source 13 will impinge directly upon the exposed edge of the transparent dial 10.

In the above description the instruments or devices for indicating temperature, oil pressure and fuel, are shown in Figures 1, 2 and 3 of the drawings, as each having a separate source of illumination. However, it is possible, as shown in Figure 4 of the drawings, to arrange and construct several instruments or devices of the above character so that a single source of illumination may be used to illuminate the individual devices without in any way affecting the color signal indicating aspect of the invention. This may be accomplished in one form by merely locating two or three of the instruments upon a dash or other support 35 so that the light rays from a single source of illumination 13 may impinge upon two or more transparent dials 10. As here shown, there is a temperature indicating device located immediately below the oil pressure indicating device with the source of light 13 disposed therebetween. With this arrangement, the rays of light from the source 13 will project upwardly through the slot 23 in the bottom of the oil pressure gauge housing 19 and downwardly through the slot 32 formed in the top of the housing 19 of the temperature indicating device. When an arrangement of this character is resorted to, it will be understood that the position of the color screens 14 with respect to the pointers 12 may be changed in the several instruments so as to cooperate with the location of the light ray admitting slot which may be formed in the top, bottom or side of their respective enclosing casings 19.

In Figure 6 of the accompanying drawings there is shown a modified form of the invention in which the color screen remains stationary and the source of illumination moves with respect thereto to produce the changes of color in the dial illumination. In this embodiment the transparent dial 10 is mounted within an enclosing casing 37 which is of sufficient size to permit the suspension of an illuminating source of light therein. The movable source of light may be provided in any suitable manner. As shown, it consists of an incandescent lamp 38 mounted upon the end of an arm 39 which is secured upon the pointer supporting shaft 31 in a manner similar to that in which the previously described color screen supporting arm 15 is secured thereto. If the movement of the light source is less than a complete revolution about the shaft 31, current may be transmitted thereto by suitable flexible leads. However, if the device is such that the source of light does or may gyrate through more than a complete revolution, it may be desirable to carry the connections for the incandescent lamp 38 through collector rings 40 such as are here shown as mounted upon a pointer shaft 31. Disposed about the transparent dial 10, and between it and the path taken by the incandescent lamp 38, there is a continuous cylindrical color screen 41 which is suitably colored at particular points to change the color of the dial illumination. This color screen 41 may consist merely of a short section of a suitable color at the point corresponding to the values indicated by the pointer 12 at which a color signal is desired. The color screen 41 in some instances may also be provided with a series of different colored sections so that the illumination of the dial 10 may be changed several times during a predetermined movement of the pointer 12.

Because of the character of the illumination contemplated by the invention and provided for in the arrangement above described, wherein the dial indicia is etched or otherwise formed upon a transparent dial and rendered illuminous by the refraction of light, there is very little if any glare produced when the instrument is illuminated, and as a result it may in some instances be necessary to provide a pointer with illuminous paint or the like. However, in accordance with another aspect of the present invention, it is contemplated that the indicating pointer may be rendered visible by providing a light diffusing area 42 upon the transparent dial 10 beneath the end of the pointer, as shown in Figure 1 of the drawings. This light diffusing area 42 may be formed by etching the dial or by frosting the same in the well-known manner.

Among uses other than those described above to which the present invention is applicable, will be to the speedometer of an automobile to produce a color change in the dial illumination to indicate a dangerous and/or a speed in excess of the legal speed limit prevailing in a particular territory. Another use for the invention would be in connection with a clock dial wherein the color illumination of the dial might be changed periodically throughout any one hour or throughout any one day to indicate for distant observation by a different color of illumination the particular time indicated thereby.

In Figure 7 of the drawings there is shown an arrangement wherein a temperature indicator, an oil pressure gauge and a gasoline gauge are disposed about a single source of illumination 13 so that each instrument will be illuminated thereby. Each of these instruments are equipped with suitable means, as has been previously described, to effect a change in the color of the illumination of the individual instruments in response to the conditions indicated by the pointers thereof.

In the above described the various devices have been described as having an etched glass dial that is illuminated by light rays projected into the edge of the glass and refracted by the etched indicia upon the dial. With such an arrangement it will be seen that when the color of the light projected into the edge of the glass is changed the color of the light refracted by the indicia will also change and as a result the figures and/or indicia outlines etched upon the dial will appear changed in color. For example, under normal conditions the temperature indicating dial will show white illuminescent indicia until the temperature passes a predetermined value as for example 180 degrees. When the temperature exceeds this value of 180 degrees the red screen will be moved into a light ray intercepting position and the color of the indicia will then change to red.

In Figure 8 of the drawings there is shown a modified form of the invention wherein the etched and edge illuminated glass dial has been omitted from the structure and the light from a source 42 is projected downwardly upon the face of a dial 43 and a pointer 44 associated therewith. This instrument is provided with a front glass 45 that is secured upon a housing 46. The housing 46 is adapted to be secured upon a panel 47. The dial 43 within the housing 46 is located at the inner end of a recessed portion 48. The top of the recessed portion 48 is shown as cut away as at 49 for the admission of illuminating light rays into the space in front of the dial 43. At the top of the housing 46 and adjacent the light source 42 there is an aperture 50 through which the light rays from the source 42 may pass. Disposed beneath the aperture 50 and intercepting the light rays from the light source 42 there is a rotating colored screen 51 which functions in a manner similar to the color screen 14 described in connection with the edge illuminated dials previously described. The color screen 51 like the color screen 14 is adapted to be rotated by the mechanism which drives the indicating pointer 44. This arrangement differs, in construction and mode of operation from the previously described embodiments of the invention, only in that the light rays are projected directly upon the face of the dial rather than into the edge of a glass dial when it will be refracted by the etched indicia thereupon.

In Figure 9 there is shown a casing 46 having a similarly disposed dial 43 and pointer 44. In this arrangement a color screen 52 is adapted to slide axially into the path of the light rays from the light source 42 rather than rotate as do the color screens 14 and 51 previously described. As here shown the pointer driving means carries a cam 53 that engages a suitable member 54 upon the screen 52. The color screen 52 is biased into an inoperative right-hand position by means of a spring 55. The disposition of the cam member 53 is such that when the pointer 44 has moved into an indicating position corresponding to a predetermined danger condition the cam member 53 will cause the color screen 52 to slide adjacent the aperture 51 on the housing 46 and thus interpose a predetermined color screen in front of the source of light and by a change in the color of the illumination indicate the dangerous condition.

As shown in Figure 10 of the drawings the color screen 52 is mounted between a pair of spaced guide members 56 that extend rearwardly from the edges of an opening 57 formed in the top of the dial supporting member 48.

While I have, for the sake of clearness and in order to disclose my invention so that the same can be readily understood, described and illustrated specific devices and arrangements, I desire to have it understood that this invention may be embodied in many other arrangements. For instance, it is within the scope of this invention to provide a color screen which may by suitable means be moved axially with respect to the pointer shaft rather than radially, as described hereinabove. In such an arrangement the color screen will, as set forth in the claims, be interposed between the source of light and the exposed edge of the transparent dial which is to be illuminated thereby when a predetermined condition is indicated by the pointer of the indicating instrument or device. This is only one of a number of other ways in which the invention may be carried out that will suggest themselves to persons skilled in the art. It is believed that this invention is new and it is desired to claim it so that all such changes as come within the scope of the appended claims are to be considered as part of this invention.

Having thus described my invention, what I I claim and desire to secure by Letters Patent is:—

1. An illuminated dial indicating device, comprising a light conducting member having light refracting dial indications thereupon, a pointer cooperating with the light refracting dial indications upon said light conducting member, means for controlling the movements of said pointer, a source of light adapted to edge illuminate said light conducting member, and means cooperating with said pointer controlling means for changing the color of the light source which edge illuminates said light conducting member, whereby the color of the light refracted by all of said dial indications will change when said pointer reaches a predetermined position between its limits of travel.

2. An illuminated dial indicating device, comprising a light conducting member having light refracting dial indications thereupon, a pointer cooperating with the light refracting dial indications upon said light conducting member, means for controlling the movements of said pointer, a source of light adapted to illuminate said light conducting member, a screen having colored areas adapted to be interposed between said light conducting member and said source of light, and means cooperating with said pointer controlling means for moving said screen into a position between said light conducting member and said source of light, whereby the color of the light refracted by all of said dial indications will change when said pointer reaches a predetermined position between its limits of travel.

3. An illuminated dial indicating device, comprising a flat transparent light conducting member having light refracting dial indications thereupon, a pointer cooperating with the light refracting dial indications upon said light conducting member, means for controlling the movements of said pointer, a source of light disposed adjacent and adapted to edge illuminate said flat transparent light conducting member, a movable multicolor screen for changing the color of the light transmitted from said source of light to said flat transparent member, and means for changing the position of said color screen as said pointer moves adjacent said dial indications, whereby the color of the light refracted by said light refracting indications upon said transparent light conducting member will change when said pointer reaches predetermined positions between its limits of travel.

4. In an illuminated dial indicating device, the combination of an indicating pointer having a driving means responsive to conditions for which said indicating device is adapted to indicate, a transparent configuration bearing plate having graduations etched thereupon and corresponding to values to be indicated, a source of light adapted to edge illuminate said transparent configuration bearing dial, a light coloring screen adapted to be moved into a position between said transparent configuration bearing plate and said source of light, and means operable by said pointer driving means for moving said color screen between said source of light and the edge of said transparent configuration bearing plate when said indicating pointer reaches a predetermined point between its limits of travel adjacent the graduations upon said configuration bearing plate.

5. In apparatus of the character described, the combination of a plurality of indicating instruments arranged in substantially the same plane, and having transparent glass dials with indicating indicia thereupon, a source of light disposed adjacent said dials adapted to edge illuminate same, means cooperating with the indicia upon each of said transparent glass dials for indicating values corresponding to conditions to be indicated thereby, and means controlled by said last means for changing the color of the light transmitted to the transparent glass dials of the individual instruments independently of each of the other indicating instruments.

6. In apparatus of the character described, the combination of a plurality of indicating instruments arranged in substantially the same plane, and having transparent glass dials with indicating indicia etched thereupon, a single source of light common to all of said glass dials and adapted to edge illuminate all of said dials, a pointer cooperating with the indicating indicia upon each of said edge illuminated dials for indicating values thereupon corresponding to conditions to be indicated thereby, means for independently controlling the positions of the pointers upon said dials, and means responsive to said pointer controlling means for independently changing the color of the light transmitted to any one of said glass dials without changing the color of the light transmitted from said single source of light to the other of said glass dials.

7. In apparatus of the character described, the combination of a plurality of indicating instruments having transparent dials with light refracting indicia thereupon, all of said dials being arranged with an edge in line with a common point, a source of light disposed at said common point adapted to edge illuminate each of said transparent dials, means cooperating with said edge illuminated transparent dials for indicating values thereupon corresponding to conditions to be indicated thereby, and means operable upon the indication of a predetermined value upon any one of said dials for independently changing the color of the light transmitted from said source of light to said transparent dial without affecting the color of illumination of the other of said dials.

8. An illuminated dial indicating device, comprising a transparent light diffusing member having light refracting dial indications thereupon, a pointer cooperating with the light refracting dial indications upon said transparent light diffusing member, means for controlling the movements of said pointer over said dial indications, a source of illumination for projecting light into said transparent light diffusing member, and means associated with said pointer for changing the color of the light projected into said transparent light diffusing member as said pointer moves adjacent the light refracting dial indications, whereby the color of all of the dial indications will change when the pointer indicates a predetermined value.

9. In an apparatus of the character described, the combination of a plurality of indicating instruments each having indicia carrying dials, a single source of artificial light adapted to illuminate the dial of all of said instruments, an indicating pointer associated with each of said dials, means for independently moving said pointers over said dials, and means operable upon the indication of a predetermined condition by any one of said instruments adapted to independently change the color of the illumination of the dial of said instrument.

10. In an apparatus of the character described, the combination of a plurality of indicating instruments having indicia carrying dials, an adjacent single source of illumination adapted to illuminate the dials of said instruments, an indicating pointer associated with each of said dials, means for moving said pointers over said dials, and means operable upon the indication of a predetermined condition by at least one of said instruments adapted to change the color of the illumination of the dial of said instrument.

11. An illuminated dial indicating device, comprising a light reflecting dial having indicating indicia thereupon, a pointer cooperating with the indicia upon said dial, means responsive to conditions to be indicated upon said dial for controlling the movements of said pointer over said dial, a source of illumination for projecting light upon said dial, and means associated with said pointer for changing the color of the light projected upon said dial as said pointer moves over the indicia thereupon, whereby the color of the illumination of said dial will change when said pointer indicates a predetermined condition.

12. An illuminated dial indicating device, comprising a light reflecting dial having indicating indicia thereupon, a pointer cooperating with the indicia upon said dial, means for controlling the movements of said pointer with respect to said indicia, a source of light adapted to illuminate said dial, and means cooperating with said pointer controlling means for changing the color of the light from said source of light, whereby the color of said dial illumination will change when said pointer reaches a predetermined position between its limits of travel.

WILLIAM H. ATKINSON.